United States Patent

[11] 3,549,816

[72] Inventors Ronald E. Fenstermaker
Reynoldsburgh, Ohio;
Richard M. Swanson, Holmdel, N.J.

[21] Appl. No. 751,165
[22] Filed Aug. 8, 1968
[45] Patented Dec. 22, 1970
[73] Assignee Bell Telephone Laboratories, Incorporated
Murray Hill, Berkeley Heights, N.J.
a corporation of New York

[54] CALL REROUTING EQUIPMENT
13 Claims, 3 Drawing Figs.

[52] U.S. Cl. ........................................................ 179/27, 179/18, 179/175
[51] Int. Cl. ........................................................ H04m 3/22, H04q 3/64
[50] Field of Search ........................................... 179/27.1, 18.03, 18.21, 175

[56] References Cited
UNITED STATES PATENTS

| | | | |
|---|---|---|---|
| 2,494,475 | 1/1950 | Hersey | 179/18(.21) |
| 2,682,577 | 6/1954 | Hutton | 179/18(.21) |

*Primary Examiner*—William C. Cooper
*Attorneys*—R. J. Guenther and James Warren Falk

ABSTRACT: A system is disclosed for automatically distributing calls on incoming trunks through a switching network to operator positions under control of a marker. Equipment is furnished in the marker for enabling it to divert a test call from being automatically completed to a selected idle operator position and to switch it instead to a test access circuit. The diversion is initiated in response to a tone applied to the incoming trunk upon the call origination. It is detected by the marker for causing the release of a network path to a selected position and the establishment of a network path from the calling trunk to the test access circuit.

INVENTORS: R. E. FENSTERMAKER
R. M. SWANSON
BY Frederick W. Padden
ATTORNEY

MARKER

CALL REROUTING EQUIPMENT

BACKGROUND OF THE INVENTION

This invention relates to call rerouting equipment for switching systems and particularly to equipment for automatically rerouting test calls through a telephone call distributor system to test circuitry instead of operator positions.

Despite the increased tendency to provide automatic telephone call switching even for routine maintenance and test calls, there are still a number of instances where operator and craftsman services are required on calls for furnishing assistance. One exemplary situation is in automatic call distributor systems used for telephone directory assistance, airline reservations and department store ordering. In such systems, it has been a customary practice for all incoming calls to be automatically distributed to operator positions for service solely in response to a service request and without dialing routing digits into the distributor. As a result, it is a problem in such prior art systems to provide for the automatic connection of test calls through the system switching network to test circuits instead of operator positions.

In view of the foregoing, it is an object of our invention to eliminate the need for operator involvement on certain calls placed through a telephone call distributor system.

Another object is to provide for the automatic routing of test calls through an automatic call distributor system to test facilities instead of operator positions.

SUMMARY OF THE INVENTION

In accordance with principles of this invention, specific illustrative equipment is provided for automatic test call switching through an automatic call distributor system to testing facilities. Specifically, the equipment enables test calls originated by a craftsman to be switched from incoming line circuits through a switching network of an automatic call distributor to test facilities without operator entry onto the calls. Our equipment advantageously permits connections for both test and customer calls to be established through the network toward an operator in the customary manner and solely in response to a service request on the incoming line. In accordance with our invention, the equipment is thereafter effective to test for the presence of a test call identifying tone on the calling line. Such a tone is applied from a test control circuit under control of the call originating craftsman. On detection of such a signal, the equipment precludes the completion of the call to an operator, recycles to release the established network connection toward the operator, and then causes the calling line with the test call to be connected automatically to an idle one of a plurality of test access trunk circuits for testing operations. An advantage thereby achieved by our invention is that an operator is relieved of the task of answering and furnishing assistance to a craftsman on test calls. Consequently, operators are employed more economically and efficiently for serving customer calls.

The test access trunk circuits are illustratively associated with a pair of TOUCH-TONE receivers via TOUCH-TONE connector circuits. Such receivers are illustratively used because automatic call distributors typically receive test calls over tandem connections through distant offices. The receivers are utilized for a short duration on each test call and are therefore shared by many access trunk circuits. Upon receipt of a test call, an access circuit causes a TOUCH-TONE receiver to be switched onto the call connections via a test tone connector. The receiver then returns an interrupted dial tone over the call connection back to the craftsman as a signal for him to transmit TOUCH-TONE instruction signals over the call connections into the receiver. These signals instruct the receiver to operate an associated digit transfer circuit for controlling the extension of the test access trunk circuit to a prescribed one of the available test circuits which supply a variety of testing circuit configurations for enabling the call originating craftsman to evaluate the condition of the circuits extending the calling connection.

It is a feature of our invention that equipment in an automatic call distributor system provides for the automatic routing of special test calls to test facilities instead of operator positions.

Another feature is that the automatic call distributor system, in response to a service request, routes a calling circuit over connections through a switching network toward an operator position and that rerouting equipment thereafter is operated automatically in response to a test call identifying signal to reroute the calling circuit over other connections through the network to test facilities instead of the operator position.

Another feature related to the immediately previous one is that the reroute equipment tests the initially established connections towards an operator position for the presence of a test call identifying tone thereon and upon such detection automatically releases the tested connections and establishes reroute connections through the network to a test access trunk.

It is another feature of our invention that the test call facilities of an automatic call distributor include a test control circuit for applying both a service request and a test call identifying tone to an incoming trunk circuit of the distributor for activating the distributor control facilities to extend the test call to a test access trunk circuit instead of an operator position. As a result, the test call is treated as a special call through the distributor in contrast to a call routinely served by an operator.

Another aspect of the invention is that a timer in the test facilities be initially operated for generating a timing interval upon the connection of an incoming trunk circuit through the distributor switching network toward an operator position and that a detector detect the test tone on the latter connections for subsequently recycling the timer in order to reinitiate the timing interval during which the validity of the test tone is checked. The detector thereafter cooperates with the timer and the distributor control facilities to control the switching of the incoming trunk circuit selectively to an operator position or a test access trunk circuit.

An advantage of our invention is that it may be incorporated into existing automatic call distributing systems without necessitating substantial changes in the switching equipments or impairing established procedures for distributing telephone calls.

BRIEF DESCRIPTION OF THE DRAWING

A complete understanding of these and other advantages and features of our invention may be gained from the following detailed description together with the accompanying drawing in which.

DETAILED DESCRIPTION

The call rerouting equipment of the present invention may be advantageously incorporated in an automatic call distributor system wherein common control circuits are employed to control the establishment of calls through a switching network. One system having common control circuit arrangements suitable for telephone call distributor service is disclosed in A. J. Busch U.S. Pat. 2,585,904 issued Feb. 19, 1952. It is to be understood, however, that the present invention is not limited to use with a telephone system of this type, but may be utilized with other types of switching systems.

The invention described herein is embodied in a telephone system of the type disclosed in the cited Busch patent. It is particularly concerned with circuitry in the test control circuit 1, a marker 2, and test access trunk circuits 3, which are represented by the blocks shown in heavy lines in FIG. 1. The other equipment units are neither shown nor described in detail herein except where necessary for a complete understanding of the invention. The Busch patent may be consulted for a full understanding of the construction and operation of the other units not covered in detail herein.

Figure 1:
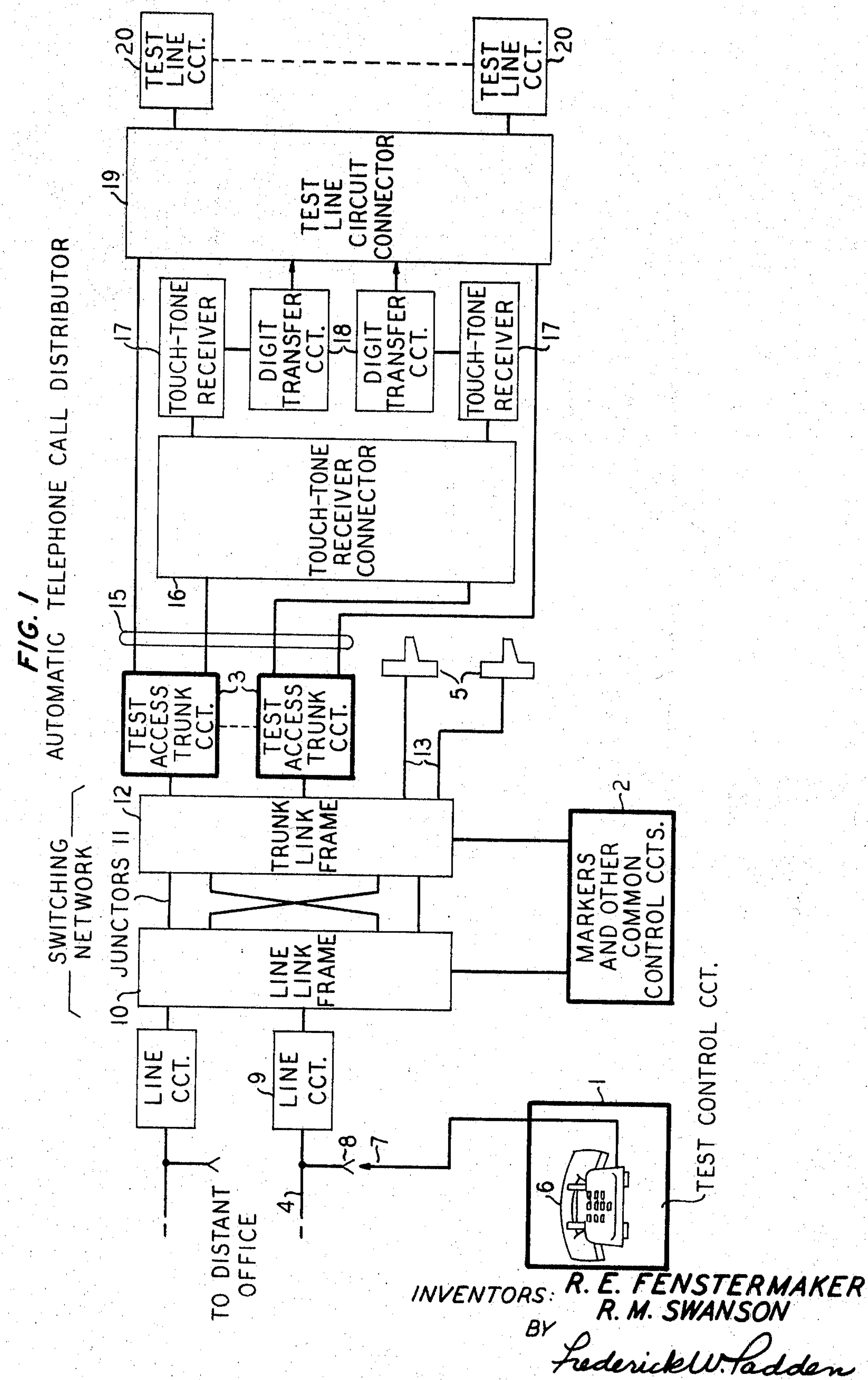
FIG. 1 is a schematic block diagram of an automatic call distributor system utilizing our rerouting equipment.

Turning now to the drawing, FIG. 1 is a schematic block diagram of an existing automatic telephone call distributor employing the switching philosophy of the Busch patent and in which our invention may be employed. For purposes of this description, it is assumed that a call on an incoming trunk 4 is to be distributed through the switching network of the call distributor to one of the operator positions 5. A call on incoming trunk 4 may be received from either a distant office or may be initiated by a craftsman from a telephone 6 in the test control circuit 1 which is illustratively connected by a patch cord 7 and jack 8 to trunk 4. The distribution of such a call from the trunk 4 through a line circuit 9, line link frame 10, interframe junctors 11, and trunk link frame 12 to an idle operator position 5 via an operator trunk 13 under control of the markers and other common control circuits 2 is accomplished in essentially the same manner as a dial tone connection is established in the aforementioned Busch patent from a line to an originating register. The manner in which such connections are established is described in the Busch patent in columns 6 through 61. The operator position circuit is essentially substituted for an originating register circuit of the Busch system.

The presence of a call on the incoming trunk 4 is recognized by a seizure or service request signal, such as a loop closure. The automatic call distributor prior art teaches that calls be distributed to operator positions for service solely in response to a service request and without the need for dialing operations on the part of a caller. This teaching is employed in the exemplary embodiment of our invention for customer calls incoming from a distant office. In accordance with our invention, test calls initiated by a craftsman on an incoming line are distributed in essentially the same manner in response to the service request signal, but to distinguish it from the routine incoming call the draftsman, in addition to generating a service request by a conventional receiver off-hook condition of telephone 6, depresses prescribed key buttons on the telephone to effect the application of a TOUCH-TONE signal to the incoming trunk 4.

In a manner as disclosed in the Busch patent beginning in column 6, a marker and other common control circuits 2 are activated in response to a call on a calling line to select and establish connections through the line and trunk link frame switching network toward an available operator position 5. According to our invention, the illustrative rerouting equipment in the marker is activated before an operator is alerted to the incoming call and prior to the cut-through of her position to the established call connections. The activated equipment tests the established connections for the presence of a test call identifying tone thereon and upon such detection desirably precludes the operator alerting and the cut-through of her telephone facilities to the established call connections. In addition, the marker effects the release of the established call connections toward the operator position and proceeds to reroute the call to an idle one of the test access circuits 3. It is an advantage of our invention therefore that operator involvement on an incoming test call is not required and that automatic call rerouting is effected from her position to test access circuits on a fully automatic basis.

In the Busch system, connections from a calling line circuit 9 through the line and trunk link frames 10 and 12 are referred to as channels. When such a channel is established in the illustrative embodiment for a call on an incoming trunk, a number of tests including false cross and ground and continuity test are made by the marker to check the integrity of the connections through the link frames 10 and 12 back to the calling line circuit 9 in a manner as disclosed in the Busch patent beginning in column 50. The rerouting equipment of our invention is advantageously integrated into the marker 2 to cooperate with the channel test circuitry shown in FIG. 109 of the Busch patent for performing a test to detect the presence of a test call identifying tone.

Figure 2:
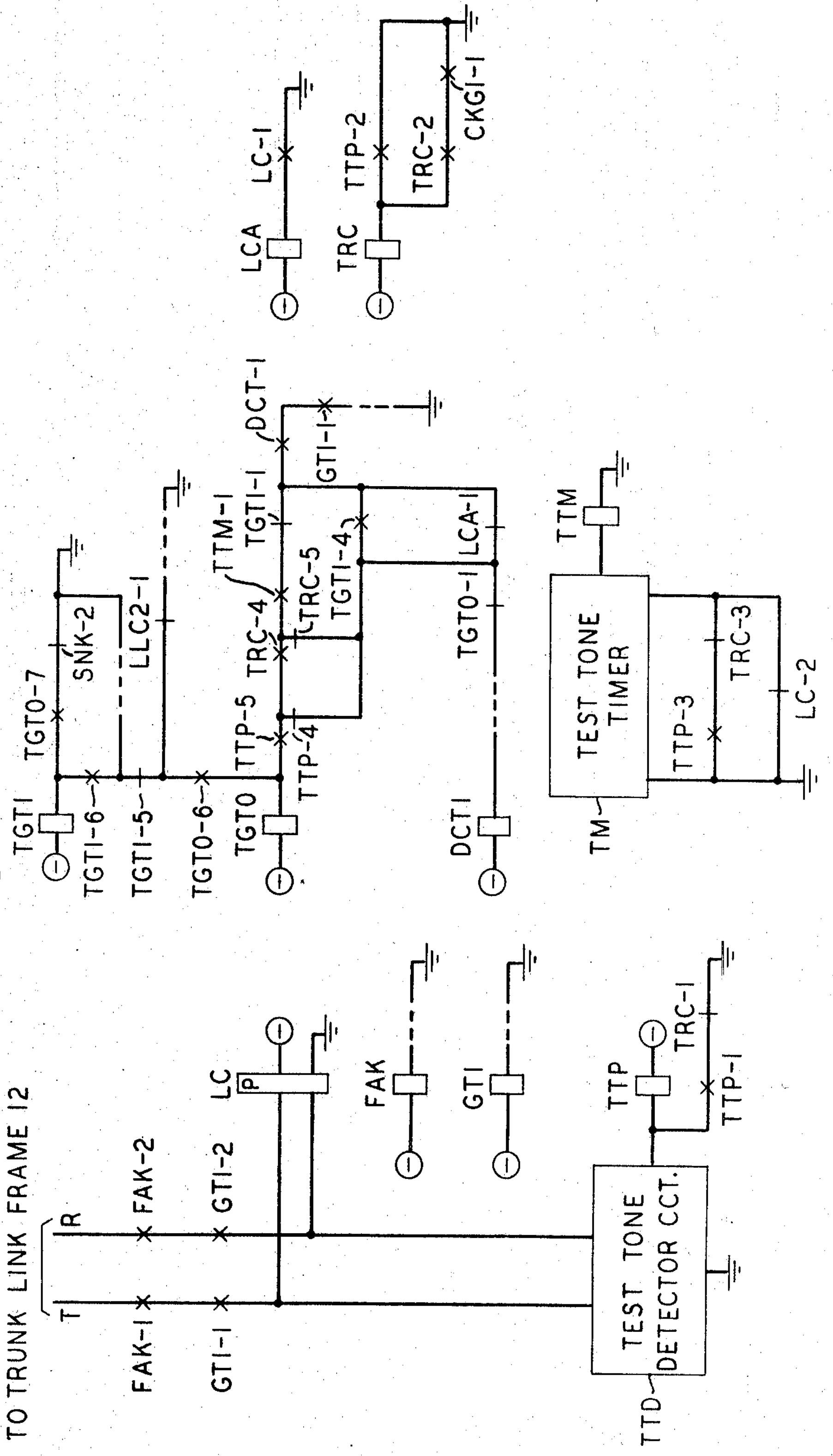
FIGS. 2 and 3 schematically illustrate the circuitry employed in a marker for detecting a test call identifying signal and for rerouting such a call to a test access trunk circuit instead of to an operator position trunk circuit.

Turning to the rerouting equipment of FIG. 2, our invention provides for the extension of the conventional tip and ring conductors T and R of the channel from the trunk link frame 12 through added contacts FAK-1, FAK-2, GT1-1 and GT1-2 of relays FAK and GT1 (corresponding to the same relays shown on FIGS. 109 and 107 respectively of the Busch patent) to a TOUCH-TONE detector circuit TTD and a polarized "line connected" LC relay. Such extension is made when relays FAK and GT1 are operated as described in the Busch patent beginning in columns 29 and 55, respectively.

Advantageously, our invention provides for a test tone check at the time the Busch system makes a double connection test. As described beginning in column 55 of the Busch patent, relay GT1 is operated to begin a double connection test and a relay DCT1 (FIG. 92 of the Busch patent) is operated to indicate a success of such a test. According to our invention, the test tone checking operations commence with the operation of relay GT1 and persist during a timing interval during which the operation of relay DCT1 is precluded.

When relay GT1 of FIG. 2 operates, it causes relay LC of FIG. 2 to operate for initiating a test tone check. Relay LC operates over the path through contacts GT1-1, GT1-2, FAK-1 and FAK-2, conductors T and R and a conventional closed tip and ring loop (not shown) through the trunk and line link frames 12 and 10 to the incoming line circuit 9 requesting service. In operating, relay LC actuates its contact LC-1 for operating an auxiliary relay LCA of FIG. 2 over the obvious path. The operation of relay LCA actuates its contact LCA-1 temporarily to open the operating path for relay DCT1 of FIG. 2 during a timing operation by a test tone timer TM of FIG. 2. Such a timing operation is initiated when relay LC operates and opens its contact LC-2.

If no tone is present on the T and R conductors for the timing interval determined by timer TM, it indicate the presence of a routine incoming customer call rather than a test call. As a result, the timer TM at the end of its timing interval operates the associated test tone timer relay TTM. In operating, relay TTM closes its contact TTM-1 for enabling relay DCT1 to be operated in response to a successful double connection test as described in the Busch patent and thereby enabling the marker to complete a connection between the service requesting line circuit 9 and a operator position 5. Relay DCT1 operates under control of relay TTM in a path including contacts TGTO-1, TRC-5, TTM-1, TGT1-1, DCT-1 and GT1-1 to ground.

If, however, the test tone is detected during the timing interval generated by timer TM, the detector TTD causes the operation of a test tone present relay TTP which then locks via its contact TTP-1 and contact TRC-1 to ground. In operating, relay TTP in turn operates relay TRC of FIG. 2 over a path and through contact TTP-2. In operating, relay TRC immediately locks via its contact TRC-2 and a priorly operated contact CKG1-1 of relay CKG1 (not shown) to ground. The operation of relay TTP effects the recycling of the timer TM by closing contact TTP-3. When relay TRC operates as priorly described, a reinitiated, or second, timing interval is generated by timer TM by the opening of contact TRC-3. This second timing interval is generated to enable the test tone detector TTD to monitor the conductors T and R to ascertain whether a persistent valid test tone is present thereon. If the test tone has disappeared during the second timing interval, relay TTM is operated at the end of the interval to close its contact TTM-1 for enabling relay DCT1 to operate in connection with the double connection test as disclosed in the Busch patent for completing a connection to an operator position. Specifically, relay DCT1 operates in a path including contacts TGTO-1, TTP-4, TRC-4, TTM-1, TGT1-1, DCT-1 and GT1-1 to ground.

When a test tone persists on the T and R conductors during the second timing interval, the equipment according to our invention recognizes the presence of a test call and causes the marker 2 both to release the channel toward the operation position 5 and to recycle in order to test, select and establish a different channel through the switching network between the line circuit 9 and an idle one of the test access trunk circuits 3. Specifically, the persistent tone activates the detector TTD to operate relay TTP during the second timing interval. At the end of that interval, the timer relay TTM is again operated for, in turn, operating a test tone relay TGTO of FIG. 2 over a path including contacts TTP-5, TRC-4, TTM-1, TGT1-1, DCT-1 and GT1-1 to ground. In operating, relay TGTO locks via its contact TGTO-6, and contact TGT1-5 to ground. An auxiliary locking path for relay TGTO is via contact TGTO-6, contact LLC2-1 of relay LLC2 of FIG. 96 in the Busch patent.

Figure 3:
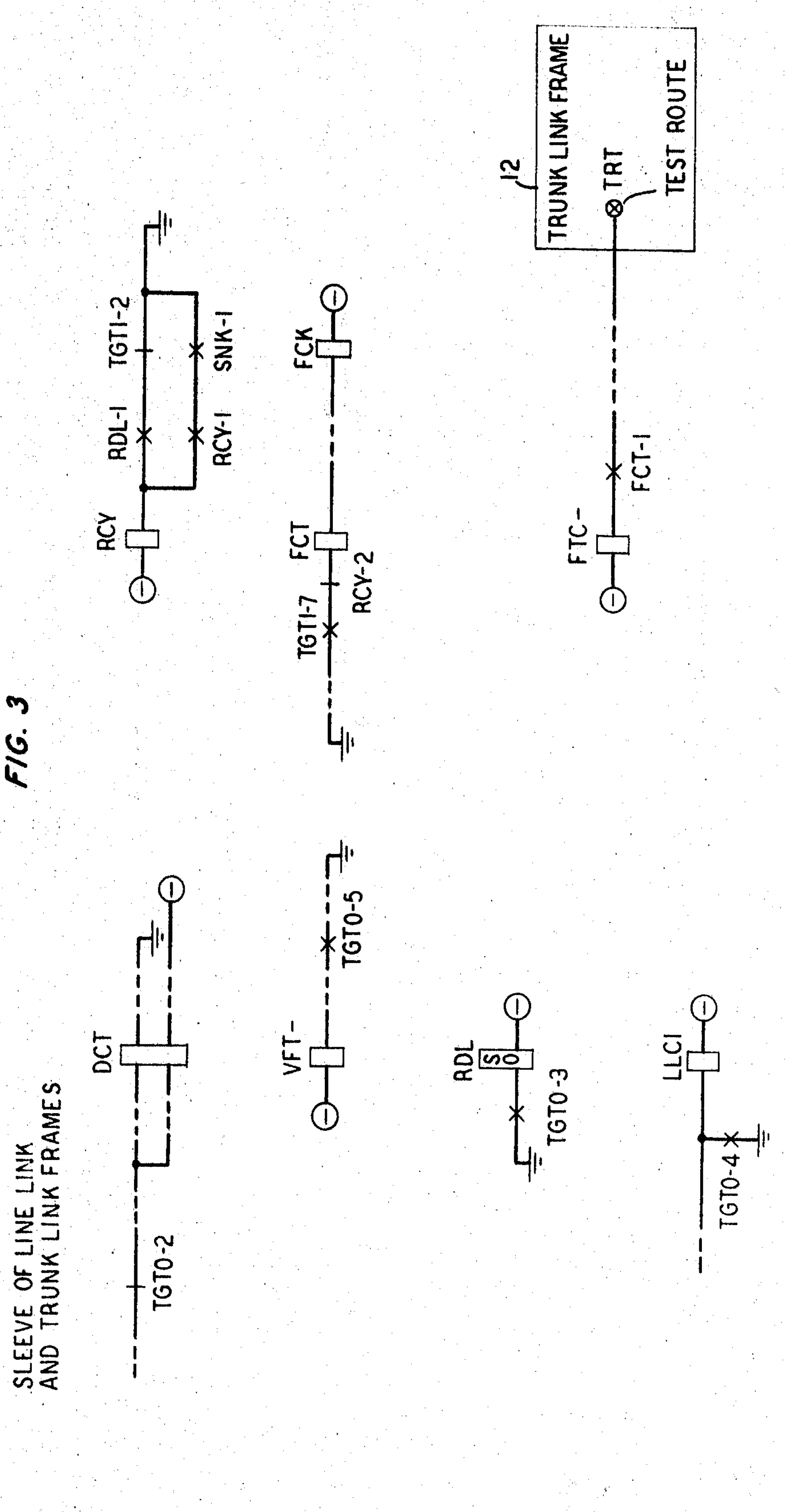

The operation of relay TGTO opens at its contact TGTO-2 of FIG. 3 the conventional sleeve lead path used for double connection tests on the channel through the line and trunk link frames 10 and 12. The opened path effects the release of the channel and makes it available for serving other calls. In addition, the opening of contact TGTO-2 effects the release of relay DCT of FIG. 3 (corresponding to relay DCT in FIG. 109 of the Busch patent). Relay DCT is priorly operated upon a successful completion of a double connection test in a manner as disclosed in the Busch patent, column 55, line 43.

Before the recycle operations are initiated, a prescribed delay is introduced following the operation of relay TGTO in order to allow sufficient time for the completion of circuit actions associated with the release of the channel toward the operator position. A slow operate relay RDL of FIG. 3 provides this delay after its obvious operate path is closed by contact TGTO-3. The operation of relay RDL activates a recycle relay RCY of FIG. 3 (corresponding to relay RCY in FIG. 149 of the Busch patent) to initiate a marker recycle operation. Relay RCY operates in a path from battery through the RCY relay winding and the contacts RDL-1 and TGT1-2. Relay RCY then immediately locks via its contact RCY-1 and contact SNK-1 of relay SNK (FIG. 128 of the Busch patent).

During the recycle operations, certain line location information pertaining to the calling line circuit 9 is retained in the marker 2 to enable circuit 9 to maintain preference over other line circuits for immediate service by marker 2 in a manner as described in the Busch patent, column 206. The operation of relay TGTO, as already described, effects the retention of such information which includes line link frame data as well as the crossbar switch vertical and horizontal group data. Upon operating, relay TGTO locks operated the the line link control relay LLC1 of FIG. 3 via contact TGTO-4 and the vertical file relays VFT- of FIG. 3 via contact TGTO-5, which relays correspond to relays LLC1 and VFT- of FIGS. 96 and 31 respectively of the Busch patent.

Following the release of the channel toward the operator position, a selections normal relay SNK (FIG. 149 of the Busch patent) in marker 2 is released as disclosed in column 206, line 45 of the Busch patent for permitting a new attempt to serve the call on line circuit 9. In accordance with the Busch system, a recycle operation on a dial tone call causes a new, or second, attempt to be made to connect a calling line to an originating register (corresponding to an operator position of the illustrative embodiment of our invention). The recycle operations of the Busch system are advantageously modified in accordance with our invention to preclude a second attempt to connect the calling line circuit 9 to an operator position 5 and instead to route line circuit 9 to an idle one of the access trunk circuits 3. Accordingly, when relay SNK releases, it operates a test tone relay TGT1 of FIG. 2 which specifies that an access trunk circuit 3 is needed for serving the call on line circuit 9. Relay TGT1 operates over a path through contacts TGTO-7 and SNK-2. In operating, relay TGT1 locks via its contact TGT1-6 and other contacts (not shown) of the marker 2. Operated relay TGT1 also effects the release of relay RCY by opening contact TGT1-2. The release of relay RCY causes a series of circuit actions which result in the operation of relay LLC2 (not shown), which in turn causes the successive release of relays TGTO and RDL. Released relay RCY also completes a path for operating a trunk link frame cut-in relay FCT of FIG. 3 which, in accordance with our invention, cooperates with other marker circuitry as later described to select and test for an idle trunk circuit 3. Relay FCT operates over the obvious path in series with the contacts TGT1-7 and RCY-2, and a frame connector check relay FCK (corresponding to relay FCK in FIG. 59 of the Busch patent). This completes the recycle operations with the marker 2 storing location data for line circuit 9 and information that a test access circuit 3 is required for connection thereto.

The marker and other common control circuits 2 then advance to select an idle test access circuit 3 on trunk link frame 12. Selection of a trunk circuit 3 is performed in essentially the same manner that the Busch system selects an originating register as disclosed in column 20, line 45 of the Busch patent. Our illustrative embodiment advantageously provides control circuitry whereby the marker 2 is specially directed during such selection to test the trunk link frame 12 for an idle trunk circuit 3. The circuitry includes a conventional FTC- relay (corresponding to an FTC- relay in FIG. 60 of the Busch patent) connected via a contact FCT-1 to a test route terminal TRT on the trunk link frame 12 which terminal is uniquely associated with the access circuits 3. When an access circuit 3 is available for serving a call, a ground is applied to terminal TRT for operating the marker relay FTC- over the obvious path. Marker 2 then proceeds in a manner similar to that disclosed in the Busch patent in column 20, line 45 to select one available access circuit and then to establish a channel through the switching network between the calling line circuit 9 and the available selected trunk circuit 3.

It is advantageous to note that the test call identifying tone may persist on the test channel through the network to the selected access trunk circuit 3. However, it does not interfere with the establishment of that channel because the illustrative embodiment of our invention advantageously cancels, or bypasses, the test for such tone in order to preclude repeated marker recycling operations. The cancellation is made at the time that relay TGT1 operates as priorly described and closes its contact TGT1-4. As a result, when the marker 2 determines the absence of a double connection on the channel to the selected access circuit in a manner as disclosed in column 55, line 43 of the Busch patent, relay DCT1 is immediately operated without waiting for the expiration of a test call timing interval by timer TM. Relay DCT1 thus operates over a path including contacts TGTO-1, TGT1-4, DCT-1 and GT1-1 to ground and immediately advances the marker 2 to cut-through connections from the calling line circuit 9 over the channel to the selected trunk circuit 3.

Before proceeding further with the description of the call processing, it is advantageous to explain the overall structure of the testing circuitry. As shown in FIG. 1, each of the test access trunk circuits 3 is connected over conductors of cable 15 to a TOUCH-TONE receiver connector 16 which selectively extends connections to a pair of TOUCH-TONE receivers 17. Each such receiver is shared by a plurality of the trunk circuits 3 because of its short holding time on each call. In addition, each such receiver 17 is connected to an individual one of the digit transfer circuits 18 for controlling the operation of a test line circuit connector 19 to extend connections over other conductors of cable 15 to any one of a plurality of test line circuits 20. The latter circuits provide a multiplicity of distinct apparatus configurations for enabling a craftsman to perform on the calling connections a variety of tests including milliwatt tone, balanced terminations and other transmission checks.

Proceeding now with the test call processing, when a channel is cut-through from the calling line circuit 9 to a selected trunk circuit 3 as already described, the latter activates the receiver connector 16 to connect an idle one of the receivers 17 to the calling channel. The connected receiver then returns interrupted dial tone over the established connections back to the craftsman as a signal for him to withdraw the test call identifying tone and to transmit TOUCH-TONE instruction signals over the call connections into the receiver. The craftsman transmits the TOUCH-TONE instruction signals over the call connections into the receiver. The craftsman transmits the TOUCH-TONE signals for requesting a connection to any one of the test line circuits 20. The transmitted signals are translated by the receiver 17 engaged on the call and cause it to operate the associated digit transfer circuit 18 for seeking the connection of the requested test line circuit onto the call. If such a circuit is unavailable, an overflow tone is returned over the call connections to the craftsman and under control of the connector 19 and the trunk circuit 3 engaged on the test call. On the other hand, when the requested test line circuit 20 is available, the aforementioned operation of the connector 19 connects that line circuit to the calling incoming trunk 4 via conductors of cable 15, trunk circuit 3, trunk and line link frames 12 and 10 as well as interframe junctors 11 and the line circuit 9. The craftsman may then proceed with the desired testing operations. Supervision over the established test call connections is thereafter maintained in the test access trunk circuit 3.

It is to be understood that the hereinbefore described arrangements are illustrative of the application of the principles of our invention. In light of this teaching, it is apparent that numerous other arrangements may be devised by those skilled in the art without departing from the spirit and scope of the invention.

We claim:

1. In an automatic call distributor system having control means for distributing each received call over connections through a switching network to an operator position solely in response to a service request, means for applying a special call identifying signal to said connections to identify a special call received by said system, an access circuit connected to said network, and means responsive to the receipt of said identifying signal for automatically operating said control means to reroute said special call for service to said access circuit.

2. In an automatic call distributor system as set forth in claim 1, the combination wherein said applying means includes means for connecting a tone signal to said connections for identifying said special call, and said operating means includes detector means for detecting said tone signal on said connections and means activated by said detector means following the detection of said tone signal for operating said control means to reroute said special call over said other connections to said access circuit instead of said operator position.

3. In a communication switching system having a switching network operable for establishing connections from a calling circuit selectively to an operator position circuit and a test access trunk circuit and control means responsive to the receipt of each service request from said calling circuit for operating said network for establishing connections from said calling circuit toward said operator position circuit, the invention comprising apparatus controlled by said control means for testing the established connections for a prescribed test call identifying tone signal thereon, and means activated by said testing apparatus upon the detection of said signal for automatically operating said network to establish connections from said calling circuit to said test access trunk circuit.

4. The invention set forth in claim 3, wherein said apparatus comprises timing means for generating a timed interval following the establishment of said connections to said operator position circuit for enabling said apparatus to detect a valid test call identifying tone within said interval, and further comprising means activated by said apparatus for canceling testing by said apparatus on said established other connections to said test access trunk circuit.

5. An automatic call distributor system comprising a plurality of incoming lines, a plurality of operator positions for serving calls on said lines, a test access trunk circuit for serving test calls on said lines, a switching network operable for establishing connections from said lines selectively to said positions and said circuit, common control means responsive to the receipt of each of said calls on any one of said lines for operating said network to establish connections for said one line toward one of said positions, apparatus responsive to the establishment of said last-mentioned connections for automatically testing said one line for the presence of a test call signal thereon, and means in said control means activated by said apparatus upon the detection of said signal for automatically controlling said network to release said connections toward said one position and to establish other of said connections from said one line to said trunk circuit.

6. An automatic call distributor system as set forth in claim 5, wherein said test call signal comprises a test tone signal, said testing apparatus comprises a tone detector connectable to connections established by said switching network and being operable for detecting the presence of said tone thereon, and said controlling means being activated by said detector upon the detection of a valid test tone signal to release said connections toward said one position and to establish other of said connections from said one line to said trunk circuit.

7. An automatic call distributor system as set forth in claim 6, wherein said controlling means comprises a timer circuit activated upon the establishment of each of said network connections for generating a timing interval within which said tone detector detects a valid test tone signal.

8. An automatic call distributor system as set forth in claim 7, wherein said timer circuit is controlled by said tone detector in the absence of a detection of said tone signal on said established connections toward said one operator position for controlling the completion of said connections to said position for service at the expiration of said timing interval.

9. An automatic call distributor system as set forth in claim 7, wherein said tone detector includes circuit means activated upon the detection of a test tone signal on said established connections toward said one operator position for recycling said timer circuit to reinitiate the generation of said timing interval, said circuit means being effective to control said timer circuit in the absence of a detection of said tone signal on said established connections toward said one operator position for controlling said switching network to complete the connection from said one line to said one position for service at the expiration of said reinitiated timing interval.

10. An automatic call distributor system as set forth in claim 7, wherein said tone detector includes circuit means activated upon the detection of a test tone on said established connections toward said one operator position for recycling said timer circuit to reinitiate the generation of said timing interval, said circuit means being subsequently effective to response to the detection of a test tone on said established connections toward said one position for activating said controlling means at the end of said reinitiated timing interval automatically to control said network to release said last-mentioned connections and to establish said other connections from said one incoming line to said trunk circuit.

11. In an automatic telephone call distributor system having a switching network operable for automatically establishing communication connections and control means responsive to the receipt of each service request from a calling circuit for operating said network to establish communication connections from said circuit toward an operator position, means for applying to said established connections via said circuit a prescribed signal identifying a special call, means responsive to the receipt of said signal on said established connections for releasing said established connections, means controlled by said releasing means for generating a delay interval to complete the release of said established connections, a special call service circuit, and means activated by said generating means for automatically recycling said control means to operate said network to establish other of said communication connections between said calling circuit and service circuit.

12. In an automatic telephone call distributor system as set forth in claim 11, the combination wherein said prescribed signal comprises a tone signal for identifying a special test call, further comprising a test control circuit for applying said tone signal via said calling circuit to said established connections toward said operator position, and wherein said releasing means includes means for detecting said tone and means activated upon the detection of said tone for activating said control means to control said network for releasing said established connections toward said position.

13. In an automatic telephone call distributor system as set forth in claim 12, the combination wherein said special call service circuit includes a trunk circuit having access to a plurality of digit receivers for controlling the establishment of connections to test circuits under control of digits transmittable from said test control circuit for testing said calling circuit and said other established connections.